US012709372B2

(12) United States Patent
Kekki et al.

(10) Patent No.: US 12,709,372 B2
(45) Date of Patent: Aug. 18, 2026

(54) ARRANGEMENT AND METHOD FOR SEALING A PROPELLER SHAFT OF A MARINE VESSEL

(71) Applicant: ABB Oy, Helsinki (FI)

(72) Inventors: Tuomas Kekki, Helsinki (FI); Petri Pellinen, Helsinki (FI); Aulis Ollikainen, Mäntsälä (FI)

(73) Assignee: ABB Oy, Helsinki (FI)

( * ) Notice: Subject to any disclaimer, the term of this patent is extended or adjusted under 35 U.S.C. 154(b) by 897 days.

(21) Appl. No.: 18/047,573

(22) Filed: Oct. 18, 2022

(65) Prior Publication Data

US 2023/0119447 A1 Apr. 20, 2023

(30) Foreign Application Priority Data

Oct. 18, 2021 (EP) .................................... 21203105

(51) Int. Cl.
*B63H 23/32* (2006.01)
*F16J 15/324* (2016.01)
(Continued)

(52) U.S. Cl.
CPC .......... *B63H 23/321* (2013.01); *F16J 15/324* (2013.01); *F16N 7/40* (2013.01);
(Continued)

(58) Field of Classification Search
CPC ...... B63H 23/32; B63H 23/321; B63H 23/34; B63H 23/36; B63H 2023/321;
(Continued)

(56) References Cited

U.S. PATENT DOCUMENTS 5,137,116 A * 8/1992 Von Bergen ............. F16J 15/46 184/104.1
5,492,492 A * 2/1996 Von Bergen ......... F16J 15/3224 277/504
(Continued)

FOREIGN PATENT DOCUMENTS

CN 101769380 A 7/2010
CN 113309731 A 8/2021
(Continued)

OTHER PUBLICATIONS

European Search Report; Application No. EP 21 20 3105; Issued: Apr. 19, 2022; 2 Pages.
(Continued)

*Primary Examiner* — Daniel V Venne
(74) *Attorney, Agent, or Firm* — Whitmyer IP Group LLC

(57) ABSTRACT

An arrangement and a method for sealing a propeller shaft of a marine vessel. The arrangement including a shaft seal arrangement and a lubrication arrangement including a lubricant circulation line for conducting lubricant to and from the shaft seal arrangement and a lubricant circulator. The lubricant circulation line includes a connection line that is connected in fluid connection with the lubricant circulation line downstream of the lubricant circulator and upstream of the shaft seal arrangement, and that is connected in fluid connection with a second part of the lubricant circulation line so as to selectively conduct a part of the flow of lubricant past the shaft seal arrangement. At least one hydraulically operated pressure relief means is configured to control the flow of lubricant in the connection line.

18 Claims, 2 Drawing Sheets

(51) Int. Cl.

| | |
|---|---|
| ***F16N 7/40*** | (2006.01) |
| ***F16N 21/00*** | (2006.01) |
| ***F16N 23/00*** | (2006.01) |

(52) U.S. Cl.
CPC ............. *F16N 21/00* (2013.01); *F16N 23/00* (2013.01); *B63H 2023/327* (2013.01); *F16C 2326/30* (2013.01); *F16N 2210/06* (2013.01); *F16N 2250/06* (2013.01); *F16N 2270/60* (2013.01); *F16N 2280/00* (2013.01)

(58) Field of Classification Search
CPC ........ B63H 2023/322; B63H 2023/323; B63H 2023/325; B63H 2023/327; F16N 7/36; F16N 7/40; F16N 21/00; F16N 23/00; F16N 2210/06; F16N 2250/06; F16N 2270/60; F16N 2280/00; F16N 29/02; F16N 2250/40; F16J 15/3204; F16J 15/324; F16J 15/54
USPC .................................. 440/1, 78, 79, 83, 112
See application file for complete search history.

(56) References Cited

U.S. PATENT DOCUMENTS

| | | | | |
|---|---|---|---|---|
| 8,690,162 | B2 * | 4/2014 | Chang .................. | B63H 23/321 277/633 |
| 2006/0054404 | A1 | 3/2006 | El-Ibiary | |

FOREIGN PATENT DOCUMENTS

| | | | |
|---|---|---|---|
| DE | 2926660 | A1 | 1/1981 |
| EP | 2698315 | A1 | 2/2014 |
| EP | 3677791 | A1 | 7/2020 |
| WO | 2012085325 | A1 | 6/2012 |
| WO | 2016071656 | A1 | 5/2016 |
| WO | 2018216155 | A1 | 11/2018 |

OTHER PUBLICATIONS

Chinese Office Action; Application No. 2022112655066; Issued: Aug. 26, 2025; 2 Pages.

Chinese 2nd Office Action; Application No. 202211265506.6; Completed: Mar. 3, 2026; Issued: Mar. 6, 2026; 8 Pages.

* cited by examiner

ARRANGEMENT AND METHOD FOR SEALING A PROPELLER SHAFT OF A MARINE VESSEL

TECHNICAL FIELD

The invention relates to an arrangement for sealing a propeller shaft of a marine vessel, wherein the arrangement comprising a shaft seal arrangement for sealing the propeller shaft against sea water, and a lubrication arrangement comprising a lubricant circulation line for conducting lubricant to said shaft seal arrangement and for conducting lubricant from said shaft seal arrangement, a lubricant circulator configured to create a flow of lubricant in the lubricant circulation line and in said shaft seal arrangement, wherein the lubricant circulation line defines a first part downstream of the lubricant circulator and upstream of the shaft seal arrangement and a second part downstream of the shaft seal arrangement and upstream of the lubricant circulator. The invention also relates to a method for sealing a propeller shaft of a marine vessel with a sealing arrangement a shaft seal arrangement for sealing the propeller shaft against sea water, and a lubrication arrangement comprising a lubricant circulation line for conducting lubricant to said shaft seal arrangement and for conducting lubricant from said shaft seal arrangement, a lubricant circulator configured to create a flow of lubricant in the lubricant circulation line and in said shaft seal arrangement, wherein the lubricant circulation line defines a first part downstream of the lubricant circulator and upstream of the shaft seal arrangement and a second part downstream of the shaft seal arrangement and upstream of the lubricant circulator, wherein the method comprises creating a flow of lubricant in the lubricant circulation line and in said shaft seal arrangement by means of the lubricant circulator.

BACKGROUND

A pressure is needed in the lubrication arrangement of the shaft seal arrangement to compensate for sea water pressure that is dependent on the draught i.e., the depth at which the propeller shaft is at in the surrounding water. A draught of e.g., 4 meters equals to a pressure of about 0.4 bar acing on the shaft seal arrangement for sealing the propeller shaft against the surrounding water.

Publications WO 2012/085325 and WO 2016/071656 presents sealing arrangements for sealing a propeller shaft of a marine vessel.

SUMMARY

The object of the invention is to provide a simple arrangement and a simple method for sealing a propeller shaft of a marine vessel. The arrangement of the invention, preferred embodiments of the arrangement, the method of the invention, and preferred embodiments of the method are defined in the claims.

BRIEF DESCRIPTION OF THE DRAWINGS

In the following the invention will be described in more detail by referring to the figures, of which

DETAILED DESCRIPTION

Figure 1:
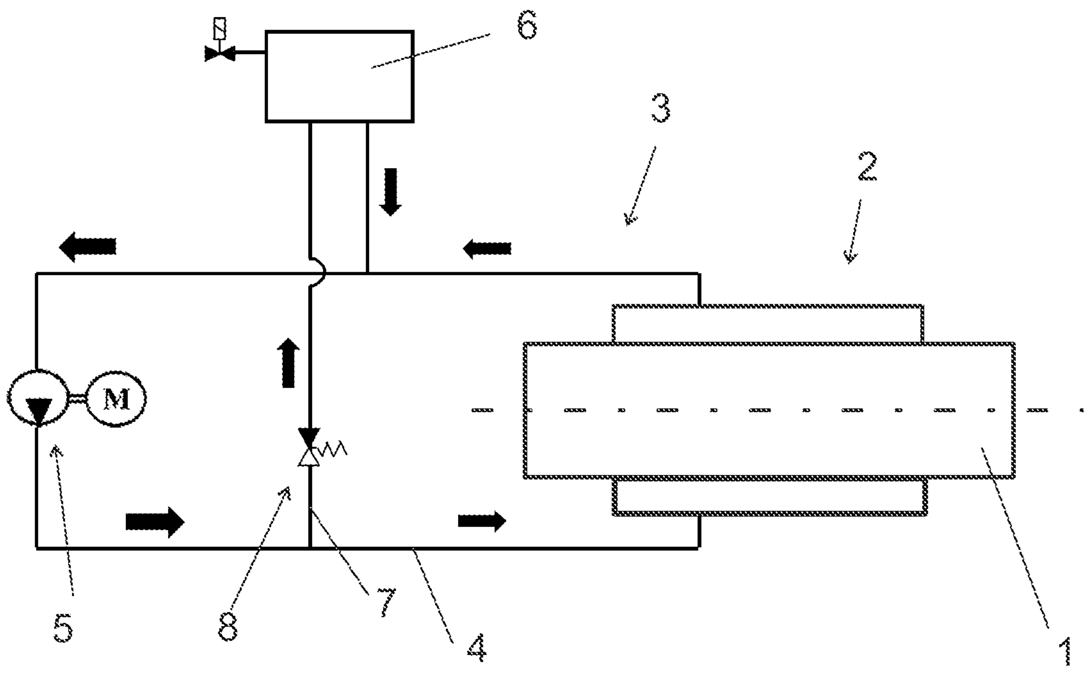
FIG. 1 illustrates an embodiment of the arrangement for sealing a propeller shaft of a marine vessel.

First the arrangement for sealing a propeller shaft 1 of a marine vessel (not illustrated) and some variants and embodiments of the arrangement will be described in greater detail.

The arrangement comprises a shaft seal arrangement 2 for sealing the propeller shaft 1 against sea water.

The propeller shaft 1 can be rotatable supported with at least one bearing (not illustrated).

The propeller shaft 1 can be arranged at a hull (not illustrated) of a marine vessel such as at a ship or at a propulsion unit (not illustrated) such as at an azimuthing podded propulsor that is arranged at a hull of a marine vessel such as at a ship.

If the propeller shaft 1 is arranged at a hull of a marine vessel, the propeller shaft has a first portion (not illustrated) that penetrates out of the hull of the marine vessel into sea water when the marine vessel floats in sea water and to which first portion at least one propeller is attached and a second portion (not illustrated) that is within the hull of the marine vessel and to which second portion a drive means for rotating the propeller shaft 1 is functionally connected.

If the propeller shaft 1 is arranged at a propulsion unit that is arranged hull of a marine vessel, the propeller shaft has a first portion that penetrates out of a shell structure of the propulsion unit into sea water when the marine vessel floats in sea water and to which first portion at least one propeller is attached and a second portion that is within the shell structure of the propulsion unit and to which second portion a drive means for rotating the propeller shaft 1 is functionally connected.

The arrangement comprises a lubrication arrangement 3 comprising a lubricant circulation line 4 for conducting lubricant to said shaft seal arrangement 2 and for conducting lubricant from said shaft seal arrangement 2 and a lubricant circulator 5 configured to create a flow of lubricant in the lubricant circulation line 4 and in said shaft seal arrangement 2.

The lubricant circulation line 4 defines a first part (not marked with a reference number) downstream of the lubricant circulator 5 and upstream of the shaft seal arrangement 2 and a second part (not marked with a reference number) downstream of the shaft seal arrangement 2 and upstream of the lubricant circulator 5.

The second part of the lubricant circulation line 4 can comprise a lubricant tank 6 that is in fluid connecting with the lubricant circulation line 4 and that is configured to feed lubricant to the lubricant circulation line 4. The lubricant tank 6 has preferably, but not necessarily, a valve (not marked with a reference number) or the like leading through a shell structure (not marked with a reference number) of the lubricant tank 6 for controlling the pressure in the lubricant tank 6 by for example allowing gas such as air to enter the lubricant tank 6 from the outside of the lubricant tank 6 in a controlled fashion and to exit the lubricant tank 6 to the outside of the lubricant tank 6 in a controlled fashion. Said controlling the pressure in the lubricant tank 6 can be used to at least partly control the pressure in the lubricant circulation line 4.

The first part of the lubricant circulation line 4 comprises a connection line 7 that is connected in fluid connection with the lubricant circulation line 4 downstream of the lubricant circulator 5 and upstream of the shaft seal arrangement 2, and that is connected in fluid connection with the second part of the lubricant circulation line 4 so as to selectively conduct a part of the flow of lubricant past the shaft seal arrangement 2.

At least one hydraulically operated pressure relief means 8 configured to control the flow of lubricant in the connection line 7.

Said at least one hydraulically operated pressure relief means 8 is configured to be operated by means of the lubricant circulating in the first part of the lubricant circulation line 4. Said at least one hydraulically pressure relief means 8 is configured to sense characteristics of the flow of the lubricant circulating in the first part of lubricant circulation line 4.

Said at least one hydraulically pressure relief means 8 is configured to be hydraulically operated by means of the lubricant circulating in the first part of the lubricant circulation line 4 in response to the sensed characteristics of the flow of the lubricant circulating in the first part of lubricant circulation line 4.

The hydraulically operated pressure relief means 8 enables to have a high flow rate in the lubrication arrangement 3 without a risk that the pressure in the shaft seal arrangement 2 would damage the shaft seal arrangement 2 and/or a risk that that the pressure in the shaft seal arrangement 2 would press lubricant out of the shaft seal arrangement 2 into sea water, because the pressure in the shaft seal arrangement 2 will be automatically controlled with the hydraulically operated pressure relief means 8.

Because the hydraulically operated pressure relief means 8 can be configured to sense the pressure of the lubricant circulating in the lubricant circulation line 4 and to be open if the pressure of the lubricant circulating in the lubricant circulation line 4 exceeds a threshold value and to be closed if the pressure of the lubricant circulating in the lubricant circulation line 4 subceeds the threshold value, the pressure in the lubrication arrangement 3 can be controlled without auxiliary sensoring and/or software.

Controlling of the pressure of the lubricant circulating in the lubricant circulation line 4 is independent of the temperature of the lubricant circulating in the lubrication arrangement 3.

Figure 2:
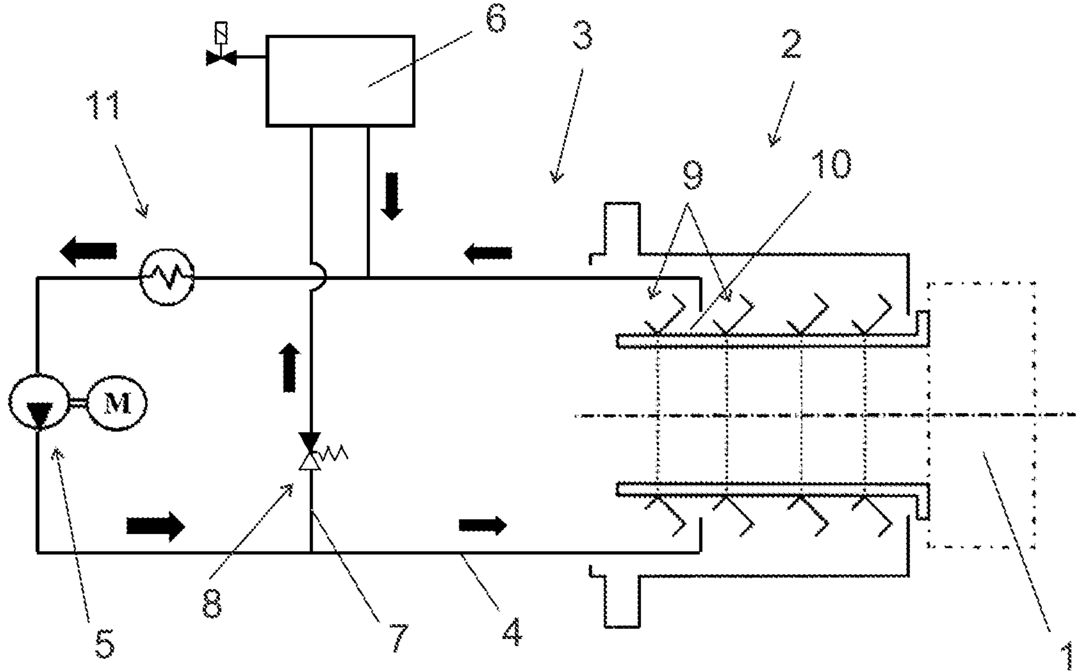
FIG. 2 illustrates another embodiment of the arrangement for sealing a propeller shaft of a marine vessel.

In the embodiments of the arrangement illustrated in FIGS. 1 and 2, one hydraulically operated pressure relief means 8 is provided in the connection line 7.

In the embodiments of the arrangement illustrated in FIGS. 1 and 2, the characteristics of the flow of the lubricant circulating in the first part of lubricant circulation line 4 said one hydraulically pressure relief means 8 is configured to sense is the pressure of the lubricant circulating in the first part of the lubricant circulation line 4. Said one hydraulically pressure relief means 8 is in the embodiments of the arrangement illustrated in FIGS. 1 and 2 configured to be open if the pressure of the flow of lubricant circulating in the first part of lubricant circulation line 4 exceeds a threshold value for the pressure and configured to be closed if the pressure of the flow of lubricant circulating in the lubricant circulation line 4 subceeds the threshold value for the pressure. Configured to be open does in this connection not necessarily mean "fully open", but can also mean "partly open".

In the embodiments of the arrangement illustrated in FIGS. 1 and 2, said one hydraulically operated pressure relief means 8 can be a check valve, wherein the threshold value for pressure being a cracking pressure of the check valve.

Figure 3:
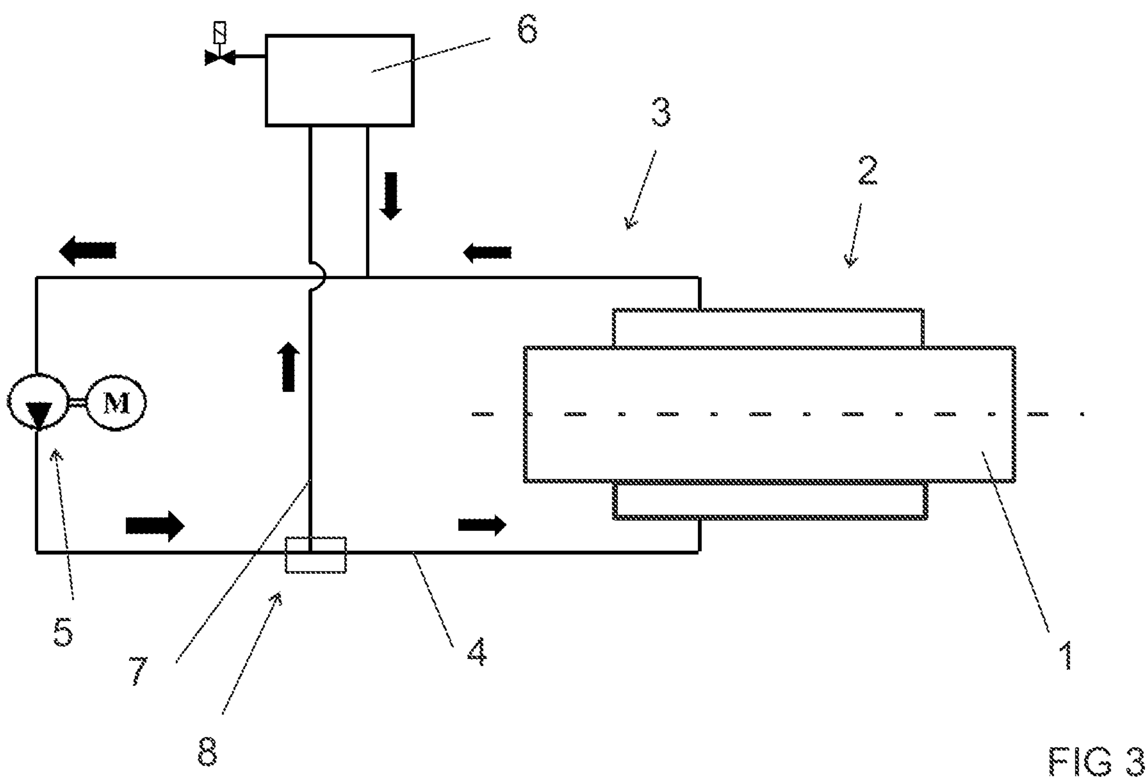
FIG. 3 illustrates yet another embodiment of the arrangement for sealing a propeller shaft of a marine vessel.
Figure 4:
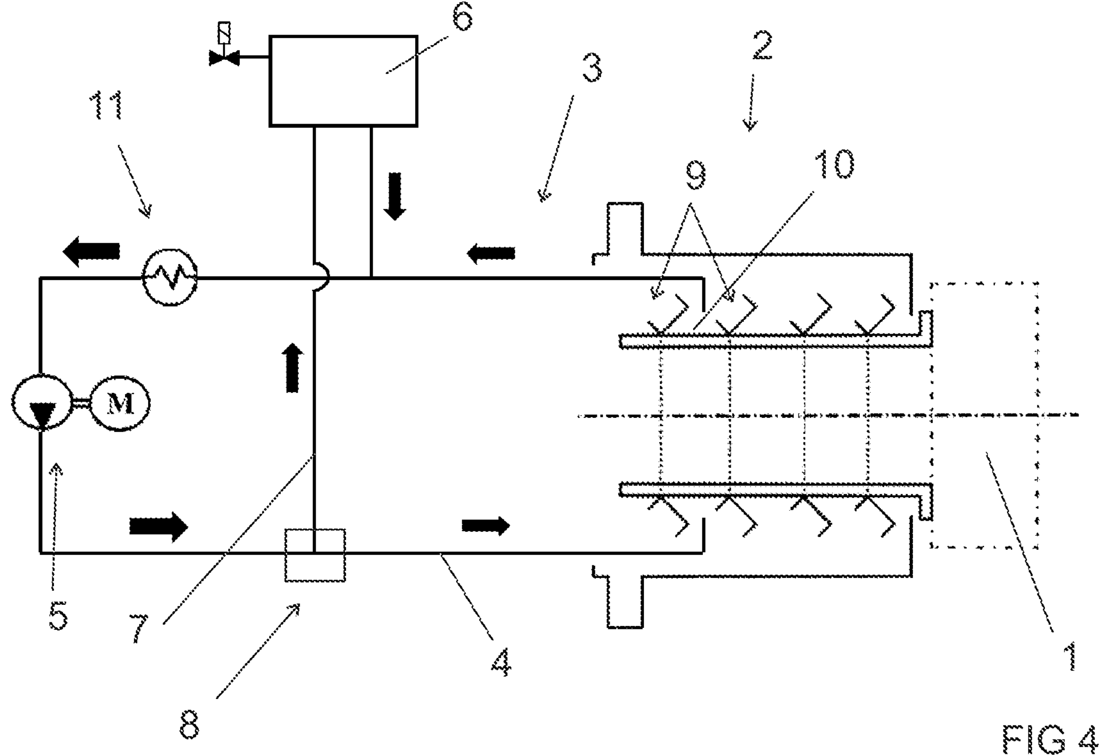
FIG. 4 illustrates yet another embodiment of the arrangement for sealing a propeller shaft of a marine vessel.

In the embodiments of the arrangement illustrated in FIGS. 3 and 4, said one hydraulically operated pressure relief means 8 is configured to connect the connection line 7 in fluid connection with the lubricant circulation line 4 downstream of the lubricant circulator 5 and upstream of the shaft seal arrangement 2.

In the embodiments of the arrangement illustrated in FIGS. 3 and 4, the characteristics of the flow of the lubricant circulating in the first part of lubricant circulation line 4 said one hydraulically pressure relief means 8 is configured to sense is at least one of the volumetric flow rate of the lubricant circulating in the first part of the lubricant circulation line 4 and the pressure of the lubricant circulating in the first part of the lubricant circulation line 4. Said one hydraulically operated pressure relief means 8 is in the embodiments of the arrangement illustrated in FIGS. 3 and 4 configured to redirect a part of the flow of lubricant circulating in the lubricant circulation line 4 into the connection line 7 if at least one of the volumetric flow rate of the lubricant circulating in the first part of the lubricant circulation line 4 exceeds a threshold value for the volumetric flow rate and the pressure of the lubricant circulating in the first part of the lubricant circulation line 4 exceeds a threshold value for the pressure.

In the embodiments of the arrangement illustrated in FIGS. 3 and 4, said one hydraulically operated pressure relief means 8 can for example be a resistance valve or a throttling flow control valve or a pressure compensated flow control valve.

In the arrangement, by the connection line 7 is preferably, but not necessarily, as illustrated in FIGS. 1 to 4, connected in fluid connection with the second part of the lubricant circulation line 4 by being connected in fluid connection with the optional lubricant tank 6 of the second part of the lubricant circulation line 4. This provides for better control of the amount and the pressure of the lubricant flowing in the second part of the lubricant circulation line 4.

In some embodiments and variants of the arrangement, the shaft seal arrangement 2 can, as illustrated in FIGS. 2 and 4, comprise a plurality of seal rings 9 axially space apart from each other and engaging the outer circumference of the propeller shaft 1 such that at least one lubricant seal chamber 10 is delimited between adjacent seal rings 9 and the outer circumference of the propeller shaft 1. In such embodiments and variants of the arrangement, the lubricant circulation line 4 for conducting lubricant to said shaft seal arrangement 2 and for conducting lubricant from said shaft seal arrangement 2 is configured to conduct lubricant to said at least one lubricant seal chamber 10 and configured to conduct lubricant from said at least one lubricant seal chamber 10. In such embodiments and variants of the arrangement, the lubricant circulator 5 configured to create a flow of lubricant in the lubricant circulation line 4 and in said shaft seal arrangement 2 being configured to create a flow of lubricant in the lubricant circulation line 4 and in said at least one lubricant seal chamber 10. In such embodiments and variants of the arrangement, at least one of the seal rings 9 can comprise seal lips. In such embodiments and variants of the arrangement, the arrangement protects the seal rings 9 such as the seal lips from being damaged.

In the arrangement, heat exchanger 11 can be in thermal contact with the lubricant circulation line 4. A purpose of the heat exchanger 11 is to control the temperature of the lubricant flowing in the lubricant circulation line.

Next the method for sealing a propeller shaft 1 of a marine vessel with a sealing arrangement and some embodiments and variants of the method will be described in greater detail.

The sealing arrangement used in the method comprises a shaft seal arrangement 2 for sealing the propeller shaft 1 against sea water.

The propeller shaft 1 can be rotatable supported with at least one bearing (not illustrated).

The propeller shaft 1 can be arranged at a hull of a marine vessel such as a ship or at a propulsion unit such as at an azimuthing podded propulsor that is arranged at a hull of a marine vessel such as of a ship.

If the propeller shaft 1 is arranged at a hull of a marine vessel, the propeller shaft has a first portion that penetrates out of the hull of the marine vessel into sea water when the marine vessel floats in sea water and to which first portion at least one propeller is attached and a second portion that is within the hull of the marine vessel and to which second portion a drive means for rotating the propeller shaft 1 is functionally connected.

If the propeller shaft 1 is arranged at a propulsion unit that is arranged hull of a marine vessel, the propeller shaft has a first portion that penetrates out of a shell structure of the propulsion unit into sea water when the marine vessel floats in sea water and to which first portion at least one propeller is attached and a second portion that is within the shell structure of the propulsion unit and to which second portion a drive means for rotating the propeller shaft 1 is functionally connected.

The sealing arrangement used in the method comprises a lubrication arrangement 3 comprising a lubricant circulation line 4 for conducting lubricant to said shaft seal arrangement 2 and for conducting lubricant from said shaft seal arrangement 2, and a lubricant circulator 5 configured to create a flow of lubricant in the lubricant circulation line 4 and in said shaft seal arrangement 2.

The lubricant circulation line 4 defines a first part (not marked with a reference number) downstream of the lubricant circulator 5 and upstream of the shaft seal arrangement 2 and a second part (not marked with a reference number) downstream of the shaft seal arrangement 2 and upstream of the lubricant circulator 5.

The second part of the lubricant circulation line 4 of the sealing arrangement used in the method can comprise a lubricant tank 6 that is in fluid connecting with the lubricant circulation line 4 and that is configured to feed lubricant to the lubricant circulation line 4. The lubricant tank 6 has preferably, but not necessarily, a valve (not marked with a reference number) or the like leading through a shell structure (not marked with a reference number) of the lubricant tank 6 for controlling the pressure in the lubricant tank 6 by for example allowing gas such as air to enter the lubricant tank 6 from the outside of the lubricant tank 6 in a controlled fashion and to exit the lubricant tank 6 to the outside of the lubricant tank 6 in a controlled fashion. Said controlling the pressure in the lubricant tank 6 can be used to at least partly control the pressure in the lubricant circulation line 4.

The method comprises creating a flow of lubricant in the lubricant circulation line 4 and in said shaft seal arrangement 2 by means of the lubricant circulator 5. The method can comprise and feeding lubricant from the lubricant tank 6 into the lubricant circulation line 4, provided that the second part of the lubricant circulation line 4 is provided with such lubricant tank.

The method comprises providing the first part of the lubricant circulation line 4 with a connection line 7 and connecting the connection line 7 in fluid connection with the lubricant circulation line 4 downstream of the lubricant circulator 5 and upstream of the shaft seal arrangement 2, and connecting the connection line 7 in fluid connection with the second part of the lubricant circulation line 4 so as to selectively conduct a part of the flow of lubricant past the shaft seal arrangement 2.

The method comprises providing at least one hydraulically operated pressure relief means 8 configured to control the flow of lubricant in the connection line 7, wherein said at least one hydraulically operated pressure relief means 8 is configured to be operated by means of the lubricant circulating in the first part of the lubricant circulation line 4.

The method comprises sensing characteristics of the flow of the lubricant circulating in the first part of lubricant circulation line 4 by said at least one hydraulically pressure relief means 8.

The method comprises hydraulically operating said at least one hydraulically pressure relief means 8 by means of the lubricant circulating in the first part of the lubricant circulation line 4 in response to the sensed characteristics of the flow of the lubricant circulating in the first part of lubricant circulation line 4.

The hydraulically operated pressure relief means 8 enables to have a high flow rate in the lubrication arrangement 3 without a risk that the pressure in the shaft seal arrangement 2 would damage the shaft seal arrangement 2 and/or a risk that that the pressure in the shaft seal arrangement 2 would press lubricant out of the shaft seal arrangement 2 into sea water, because the pressure in the shaft seal arrangement 2 will be automatically controlled with the hydraulically operated pressure relief means 8.

Because the hydraulically operated pressure relief means 8 can be configured to sense the pressure of the lubricant circulating in the lubricant circulation line 4 and to be open if the pressure of the lubricant circulating in the lubricant circulation line 4 exceeds a threshold value and to be closed if the pressure of the lubricant circulating in the lubricant circulation line 4 subceeds the threshold value, the pressure in the lubrication arrangement 3 can be controlled without auxiliary sensoring and/or software.

Controlling of the pressure of the lubricant circulating in the lubricant circulation line 4 is independent of the temperature of the lubricant circulating in the lubrication arrangement 3.

Some embodiments and variants of the method comprises, as illustrated in FIGS. 1 and 2, providing one hydraulically operated pressure relief means 8 in the connection line 7. In such embodiments and variants of the method, the characteristics of the flow of the lubricant circulating in the first part of lubricant circulation line 4 said one hydraulically pressure relief means 8 is configured to sense can be the pressure of the lubricant circulating in the first part of the lubricant circulation line 4, wherein the method includes keeping said one hydraulically pressure relief means 8 open if the pressure of the flow of lubricant circulating in the first part of lubricant circulation line 4 exceeds a threshold value for the pressure, and keeping said one hydraulically pressure relief means 8 closed if the pressure of the flow of lubricant circulating in the lubricant circulation line 4 subceeds the threshold value for the pressure. Configured to keeping open does in this connection not necessarily mean “fully open”, but can also mean “partly open”. In such embodiments and variants of the method, the method can include providing said one hydraulically operated pressure relief means 8 in the form of a check valve, wherein the threshold value for pressure being a cracking pressure of the check valve.

Some embodiments and variants of the method comprises, as illustrated in FIGS. 3 and 4, connecting the connection line 7 in fluid connection with the lubricant circulation line 4 downstream of the lubricant circulator 5 and upstream of the shaft seal arrangement 2 with one hydraulically operated pressure relief means 8. In such embodiments and variants of the method, the characteristics of the flow of the lubricant circulating in the first part of lubricant circulation line 4 said one hydraulically pressure relief means 8 is configured to sense can be at least one of the volumetric flow rate of the lubricant circulating in the first part of the lubricant circulation line 4 and the pressure of the lubricant circulating in the first part of the lubricant circulation line 4, wherein the method comprises redirecting a part of the flow of lubricant circulating in the lubricant circulation line 4 with said one hydraulically operated pressure relief means 8 into the connection line 7 if at least one of the volumetric flow rate of the lubricant circulating in the first part of the lubricant circulation line 4 exceeds a threshold value for the volumetric flow rate and the pressure of the lubricant circulating in the first part of the lubricant circulation line 4 exceeds a threshold value for the pressure. Such embodiments and variants of the method can for example include providing said one hydraulically operated pressure relief means 8 in the form of a resistance valve or a throttling flow control valve or a pressure compensated flow control valve.

Some embodiments and variants of the method comprises, as illustrated in FIGS. 1 to 4, connecting the connection line 7 in fluid connection with the second part of the lubricant circulation line 4 by connecting the connection line 7 in fluid connection with the possible lubricant tank 6 of the second part of the lubricant circulation line 4. This provides for better control of the amount and the pressure of the lubricant flowing in the second part of the lubricant circulation line 4.

In some embodiments and variants of the method, the shaft seal arrangement 2 can comprising a plurality of seal rings 9 axially space apart from each other and engaging the outer circumference of the propeller shaft 1 such that at least one lubricant seal chamber 10 is delimited between adjacent seal rings 9 and the outer circumference of the propeller shaft 1. In such embodiments and variants of the method, the lubricant circulation line 4 for conducting lubricant to said shaft seal arrangement 2 and for conducting lubricant from said shaft seal arrangement 2 is configured to conduct lubricant to said at least one lubricant seal chamber 10 and configured to conduct lubricant from said at least one lubricant seal chamber 10. In such embodiments and variants of the method, the lubricant circulator 5 configured to create a flow of lubricant in the lubricant circulation line 4 and in said shaft seal arrangement 2 is configured to create a flow of lubricant in the lubricant circulation line 4 and in said at least one lubricant seal chamber 10, and the method includes creating a flow of lubricant in at least one lubricant seal chamber 10 of the shaft seal arrangement 2. In embodiments and variants of the method, at least one of the seal rings 9 can comprise seal lips. In such embodiments and variants of the arrangement, the arrangement protects the seal rings 9 such as the seal lips from being damaged.

Some embodiments and variants of the method includes providing a heat exchanger 11 in thermal contact with the lubricant circulation line 4. A purpose of the heat exchanger 11 is to control the temperature of the lubricant flowing in the lubricant circulation line.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. An arrangement for sealing a propeller shaft of a marine vessel, the arrangement comprising:

a shaft seal arrangement for sealing the propeller shaft against sea water, and a lubrication arrangement comprising a lubricant circulation line for conducting lubricant to said shaft seal arrangement and for conducting lubricant from said shaft seal arrangement, a lubricant circulator configured to create a flow of lubricant in the lubricant circulation line and in said shaft seal arrangement, wherein the lubricant circulation line defines a first part downstream of the lubricant circulator and upstream of the shaft seal arrangement and a second part downstream of the shaft seal arrangement and upstream of the lubricant circulator, and wherein:

the first part of the lubricant circulation line includes a connection line that is connected in fluid connection with the lubricant circulation line downstream of the lubricant circulator and upstream of the shaft seal arrangement, and that is connected in fluid connection with the second part of the lubricant circulation line so as to selectively conduct a part of the flow of lubricant past the shaft seal arrangement, at least one hydraulically operated pressure relief means configured to control the flow of lubricant in the connection line, wherein said at least one hydraulically operated pressure relief means is configured to be operated by means of the lubricant circulating in the first part of the lubricant circulation line, said at least one hydraulically operated pressure relief means is configured to sense characteristics of the flow of the lubricant circulating in the first part of lubricant circulation line, said at least one hydraulically operated pressure relief means is configured to be hydraulically operated by means of the lubricant circulating in the first part of the lubricant circulation line in response to the sensed characteristics of the flow of the lubricant circulating in the first part of lubricant circulation line, said at least one hydraulically operated pressure relief means being configured to connect the connection line in fluid connection with the lubricant circulation line downstream of the lubricant circulator and upstream of the shaft seal arrangement, the characteristics of the flow of the lubricant circulating in the first part of the lubricant circulation line said at least one hydraulically operated pressure relief means is configured to sense a volumetric flow rate of the lubricant circulating in the first part of the lubricant circulation line, and said at least one hydraulically operated pressure relief means being configured to redirect a part of the flow of the lubricant circulating in the lubricant circulation line into the connection line if the volumetric flow rate of the lubricant circulating in the first part of the lubricant circulation line exceeds a threshold value for the volumetric flow rate.

2. The arrangement according to claim 1, wherein:

said at least one hydraulically operated pressure relief means is provided in the connection line.

3. The arrangement according to claim 2, wherein:

the characteristics of the flow of the lubricant circulating in the first part of lubricant circulation line said at least one hydraulically operated pressure relief means is configured to sense is the pressure of the lubricant circulating in the first part of the lubricant circulation line, and said at least one hydraulically operated pressure relief means is configured to be open if the pressure of the flow of lubricant circulating in the first part of lubricant circulation line exceeds a threshold value for the pressure and to be closed if the pressure of the flow of lubricant circulating in the lubricant circulation line subceeds the threshold value for the pressure.

4. The arrangement according to claim 3, wherein:

said at least one hydraulically operated pressure relief means being a check valve, and the threshold value for pressure being a cracking pressure of the check valve.

5. The arrangement according to claim 1, wherein:

said at least one hydraulically operated pressure relief means being a resistance valve.

6. The arrangement according to claim 1, wherein:

the second part of the lubricant circulation line includes a lubricant tank in fluid connecting with the lubricant circulation line and configured to feed lubricant to the lubricant circulation line.

7. The arrangement according to claim 6, wherein:

the connection line being connected in fluid connection with the second part of the lubricant circulation line by being connected in fluid connection with the lubricant tank of the second part of the lubricant circulation line.

8. The arrangement according to claim 1, wherein:

the shaft seal arrangement comprising a plurality of seal rings axially space apart from each other and engaging the outer circumference of the propeller shaft such that at least one lubricant seal chamber is delimited between adjacent seal rings and the outer circumference of the propeller shaft, the lubricant circulation line for conducting lubricant to said shaft seal arrangement and for conducting lubricant from said shaft seal arrangement being configured to conduct lubricant to said at least one lubricant seal chamber and configured to conduct lubricant from said at least one lubricant seal chamber, and the lubricant circulator configured to create a flow of lubricant in the lubricant circulation line and in said shaft seal arrangement being configured to create a flow of lubricant in the lubricant circulation line and in said at least one lubricant seal chamber.

9. A method for sealing a propeller shaft of a marine vessel with a sealing arrangement comprising:

a shaft seal arrangement for sealing the propeller shaft against sea water, and a lubrication arrangement comprising a lubricant circulation line for conducting lubricant to said shaft seal arrangement and for conducting lubricant from said shaft seal arrangement, a lubricant circulator configured to create a flow of lubricant in the lubricant circulation line and in said shaft seal arrangement, wherein the lubricant circulation line defines a first part downstream of the lubricant circulator and upstream of the shaft seal arrangement and a second part downstream of the shaft seal arrangement and upstream of the lubricant circulator, and wherein the method comprises creating a flow of lubricant in the lubricant circulation line and in said shaft seal arrangement by means of the lubricant circulator, wherein the method comprises:

providing the first part of the lubricant circulation line with a connection line and connecting the connection line in fluid connection with the lubricant circulation line downstream of the lubricant circulator and upstream of the shaft seal arrangement, and connecting the connection line in fluid connection with the second part of the lubricant circulation line so as to selectively conduct a part of the flow of lubricant past the shaft seal arrangement, and providing at least one hydraulically operated pressure relief means configured to control the flow of lubricant in the connection line, wherein said at least one hydraulically operated pressure relief means is configured to be operated by means of the lubricant circulating in the first part of the lubricant circulation line, wherein the method includes sensing characteristics of the flow of the lubricant circulating in the first part of lubricant circulation line by said at least one hydraulically pressure relief means, wherein the method includes hydraulically operating said at least one hydraulically pressure relief means by means of the lubricant circulating in the first part of the lubricant circulation line in response to the sensed characteristics of the flow of the lubricant circulating in the first part of lubricant circulation line.

10. The method according to claim 9, wherein:

providing one hydraulically operated pressure relief means in the connection line.

11. The method according to claim 10, wherein:

the characteristics of the flow of the lubricant circulating in the first part of lubricant circulation line said one hydraulically pressure relief means is configured to sense is the pressure of the lubricant circulating in the first part of the lubricant circulation line, keeping said one hydraulically pressure relief means open if the pressure of the flow of lubricant circulating in the first part of lubricant circulation line exceeds a threshold value for the pressure, and keeping said one hydraulically pressure relief means closed if the pressure of the flow of lubricant circulating in the lubricant circulation line subceeds the threshold value for the pressure.

12. The method according to claim 11, wherein:

providing said one hydraulically operated pressure relief means in the form of a check valve, wherein the threshold value for pressure being a cracking pressure of the check valve.

13. The method according to claim 9, wherein:

connecting the connection line in fluid connection with the lubricant circulation line downstream of the lubricant circulator and upstream of the shaft seal arrangement with one hydraulically operated pressure relief means.

14. The method according to claim 13, wherein:

the characteristics of the flow of the lubricant circulating in the first part of lubricant circulation line said one hydraulically pressure relief means is configured to sense is the volumetric flow rate of the lubricant circulating in the first part of the lubricant circulation line, and redirecting a part of the flow of lubricant circulating in the lubricant circulation line with said one hydraulically operated pressure relief means into the connection line if the volumetric flow rate of the lubricant circulating in the first part of the lubricant circulation line exceeds a threshold value for the volumetric flow rate.

15. The method according to claim 14, wherein:

providing said one hydraulically operated pressure relief means in the form of a resistance valve.

16. The method according to claim 8, wherein:

the second part of the lubricant circulation line includes a lubricant tank in fluid connecting with the lubricant circulation line and configured to feed lubricant to the lubricant circulation line, and the method comprises feeding lubricant from the lubricant tank into the lubricant circulation line.

17. The method according to claim 16, wherein:

connecting the connection line in fluid connection with the second part of the lubricant circulation line by connecting the connection line in fluid connection with the lubricant tank of the second part of the lubricant circulation line.

18. The method according to claim 9, wherein:

the shaft seal arrangement comprising a plurality of seal rings axially space apart from each other and engaging the outer circumference of the propeller shaft such that at least one lubricant seal chamber is delimited between adjacent seal rings and the outer circumference of the propeller shaft, the lubricant circulation line for conducting lubricant to said shaft seal arrangement and for conducting lubricant from said shaft seal arrangement being configured to conduct lubricant to said at least one lubricant seal chamber and configured to conduct lubricant from said at least one lubricant seal chamber, the lubricant circulator configured to create a flow of lubricant in the lubricant circulation line and in said shaft seal arrangement being configured to create a flow of lubricant in the lubricant circulation line and in said at least one lubricant seal chamber, and the method includes creating a flow of lubricant in at least one lubricant seal chamber of the shaft seal arrangement.

* * * * *